US006843913B2

(12) United States Patent
Grant

(10) Patent No.: US 6,843,913 B2
(45) Date of Patent: Jan. 18, 2005

(54) FUEL FILTER WITH LEAK AVOIDANCE PLUG

(76) Inventor: Barry S. Grant, Rte. 1, Box 1900, Dahlonega, GA (US) 30533

( * ) Notice: Subject to any disclaimer, the term of this patent is extended or adjusted under 35 U.S.C. 154(b) by 0 days.

(21) Appl. No.: 10/656,983

(22) Filed: Sep. 5, 2003

(65) Prior Publication Data

US 2004/0094488 A1 May 20, 2004

Related U.S. Application Data

(60) Provisional application No. 60/408,849, filed on Sep. 6, 2002.

(51) Int. Cl.[7] .................. B01D 35/02; B01D 35/153
(52) U.S. Cl. ............... 210/234; 210/136; 210/416.4; 210/445; 210/446; 210/450; 210/451; 251/149.4; 251/149.6
(58) Field of Search ................. 210/136, 234, 210/235, 416.1, 416.4, 416.5, 445, 446, 450, 451; 251/149.4, 149.6; 123/196 A

(56) References Cited

U.S. PATENT DOCUMENTS

| | | |
|---|---|---|
| 1,746,274 A | 2/1930 | Otis, Jr. |
| 1,746,336 A | 2/1930 | Breer |
| 1,933,409 A | 10/1933 | Berman ................. 210/165 |
| 2,200,795 A | 5/1940 | Krieck ................. 210/140 |
| 2,692,052 A | 10/1954 | Bihler ................. 210/57 |
| 5,049,269 A | 9/1991 | Shah ................. 210/234 |
| 5,350,506 A * | 9/1994 | Dombek et al. ........... 210/136 |
| 5,516,425 A * | 5/1996 | Brieden et al. ........... 210/232 |
| 5,846,417 A * | 12/1998 | Jiang et al. .............. 210/235 |
| 6,723,239 B2 * | 4/2004 | Maxwell ................. 210/235 |
| 6,746,603 B2 * | 6/2004 | Harvey et al. ............ 210/234 |

* cited by examiner

Primary Examiner—Robert James Popovics
(74) Attorney, Agent, or Firm—Thomas, Kayden, Horstemeyer & Risley

(57) ABSTRACT

The fuel filter housing (12) is formed of inlet segment (14) and outlet segment (16) that are telescopically mounted to each other, with a seal (44) positioned between the mounting flanges (38) and (40). Valve (60) is maintained displaced from its valve seat (58) by valve actuator (66), by the valve actuator engaging the perimeter of the filter (34). When the outlet housing segment (16) moves away from inlet housing segment (14), the filter and the valve actuator (66) also move, allowing the valve the close. The amplitude of movement of the valve (60) toward and away from its seat (58) is smaller than the sealed telescopic movement of the housing segments, so that the valve closes before the segments separate, thereby limiting the amount of fuel lost from the fuel filter assembly.

12 Claims, 2 Drawing Sheets

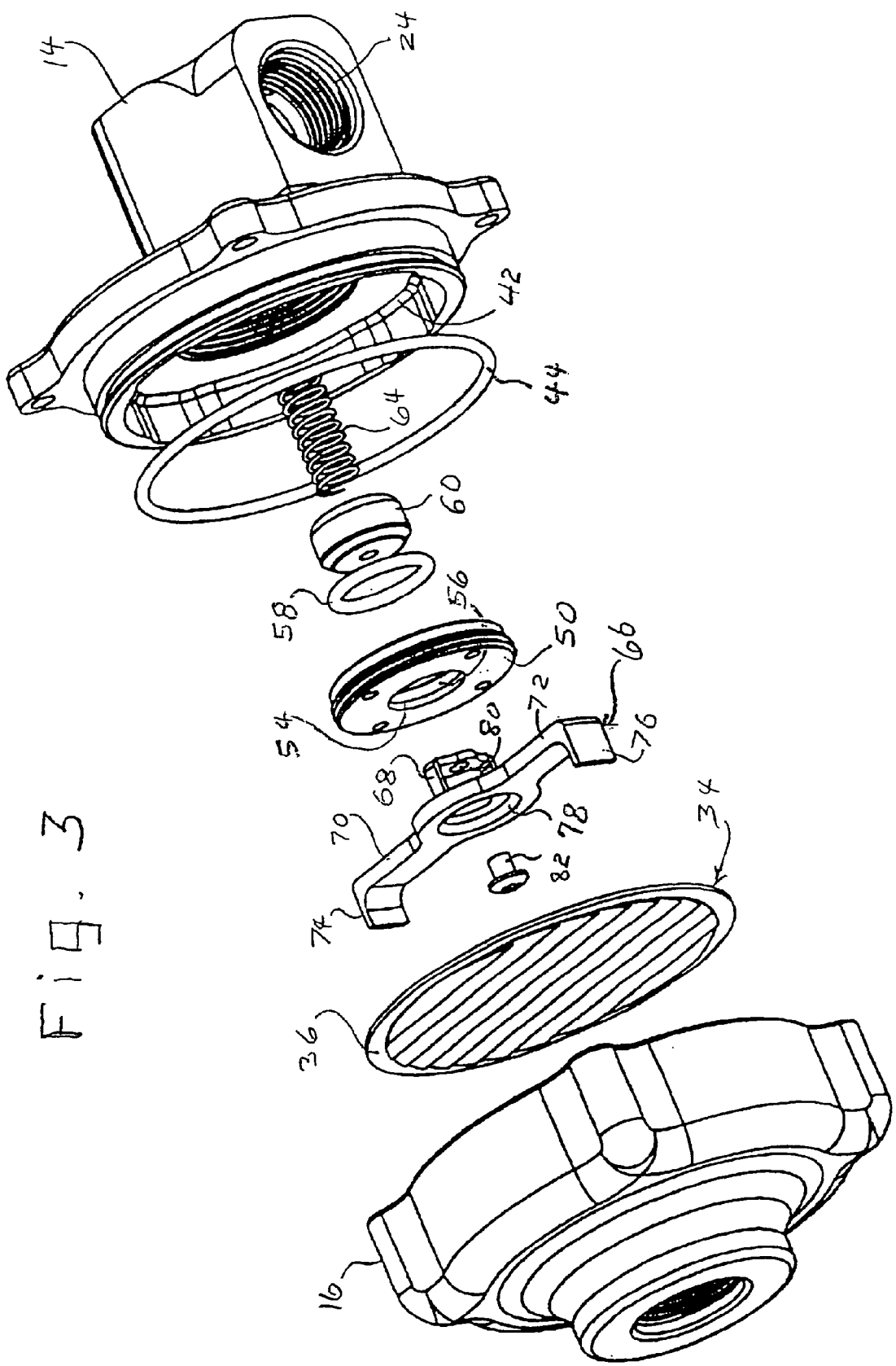

FUEL FILTER WITH LEAK AVOIDANCE PLUG

CROSS REFERENCE

Applicant claims the benefit of Provisional Application Ser. No. 60/408,849, filed Sep. 6, 2002.

FIELD OF THE INVENTION

The invention disclosed herein concerns a fuel filter for an internal combustion engine of a self-propelled vehicle. More particularly, the invention concerns an automatic plug arrangement for terminating the flow of fuel to the filter housing when the filter housing has been opened for inspection or replacement of its filter.

BACKGROUND OF THE INVENTION

Most automobiles and other vehicles that pass fuel from an on-board fuel tank to the engine have a fuel pump and a filter for transporting clean fuel from the tank to the engine. A filter is required so that any trash, debris, or other particulate matter that might be present in the tank can be filtered out of the fuel being delivered to the engine.

From time to time it is necessary to clean or replace the filter in the fuel line so as to assure proper flow of fuel from the tank to the engine. When the housing of the fuel filter assembly is opened, it is likely that the fuel from the tank will flow through the line toward the open filter housing, creating spillage of fuel about the vehicle, which is a dangerous and undesirable situation.

In the past, a remedy for avoiding fuel spillage upon opening the fuel filter housing has been to make sure that the fuel storage tank on the vehicle is substantially empty, and/or to attempt to catch the fuel being spilled from the filter housing.

It is to the solution of this problem that this invention is directed.

SUMMARY OF THE INVENTION

Briefly described, the present invention comprises a fuel filter having a leak avoidance valve that performs to close the fuel line leading from the fuel tank to the housing of the fuel filter when the filter housing is opened for inspection and/or replacement of the filter in the housing.

The filter housing is formed in separable segments, and a filter is placed between the sections. The separable housing segments have a telescopic fit and are pulled together and sealed about the perimeter of the filter.

The valve is engageable with a valve seat at the inlet port of the housing. A valve actuator includes a stem that extends from the valve into the filter chamber, and into engagement with the filter. When the filter is present in the filter chamber and the segments of the housing are being moved telescopically together and assembled about the filter, the valve actuator is moved by the filter so that it displaces the valve from the valve seat, allowing fuel to flow normally from the fuel supply tank into the filter chamber. However, when the housing segments are moved telescopically apart and the filter housing is opened, as when changing the filter, the valve actuator no longer engages the filter and the valve moves into engagement with the valve seat, thereby closing the flow of fuel from the fuel tank to the fuel filter assembly. This avoids inadvertent spillage of fuel from the fuel filter assembly, resulting in safer handling of the fuel filter assembly.

In addition, the fuel filter is disk shaped with a perimeter rim, and the valve actuator is shaped to engage the rim of the filter.

The valve housing includes an axial inlet connection and a radial inlet connection, and the housing segments are shaped so they can be rotated with respect to each other when being assembled so as to reorient the radial inlet connection at different angles about the filter housing, so as to make it more convenient for connection to the fuel supply conduit.

The housing segments are formed with mounting flanges that are sized and shaped to telescopically fit together, and a seal is positioned between the flanges. The length of the sealed telescopic fit is greater than the movement of the valve toward and away from its seat. This assures that the valve will be moved to its seated position that blocks the flow of fuel to the filter housing before the segments of the housing are separated.

Thus, it is an object of this invention to provide an improved fuel filter assembly for supplying gasoline and other liquid fuels to an internal combustion engine of a self-propelled vehicle or the like.

Another object of this invention is to provide a fuel filter assembly that provides a leak avoidance plug for avoiding spillage of fuel from the fuel filter assembly when the filter housing is opened and the fuel filter is being inspected or replaced.

Other objects, features and advantages of the present invention will become apparent upon reading the following specification, when taken in conjunction with the accompanying drawings.

BRIEF DESCRIPTION OF THE DRAWINGS

FIG. 3 is an exploded perspective illustration of the fuel filter assembly.

DETAILED DESCRIPTION

Figure 1:
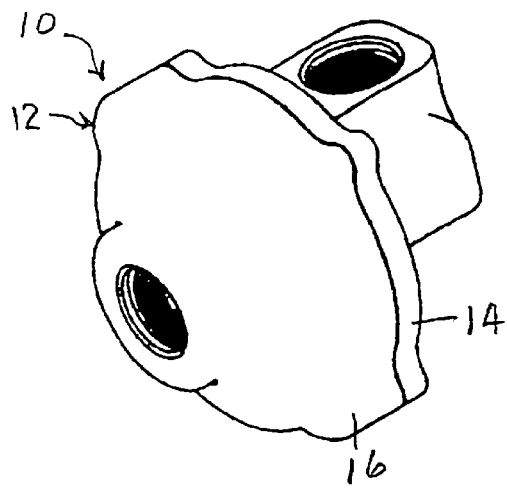
FIG. 1 is a perspective illustration of the fuel filter assembly.
Figure 2:
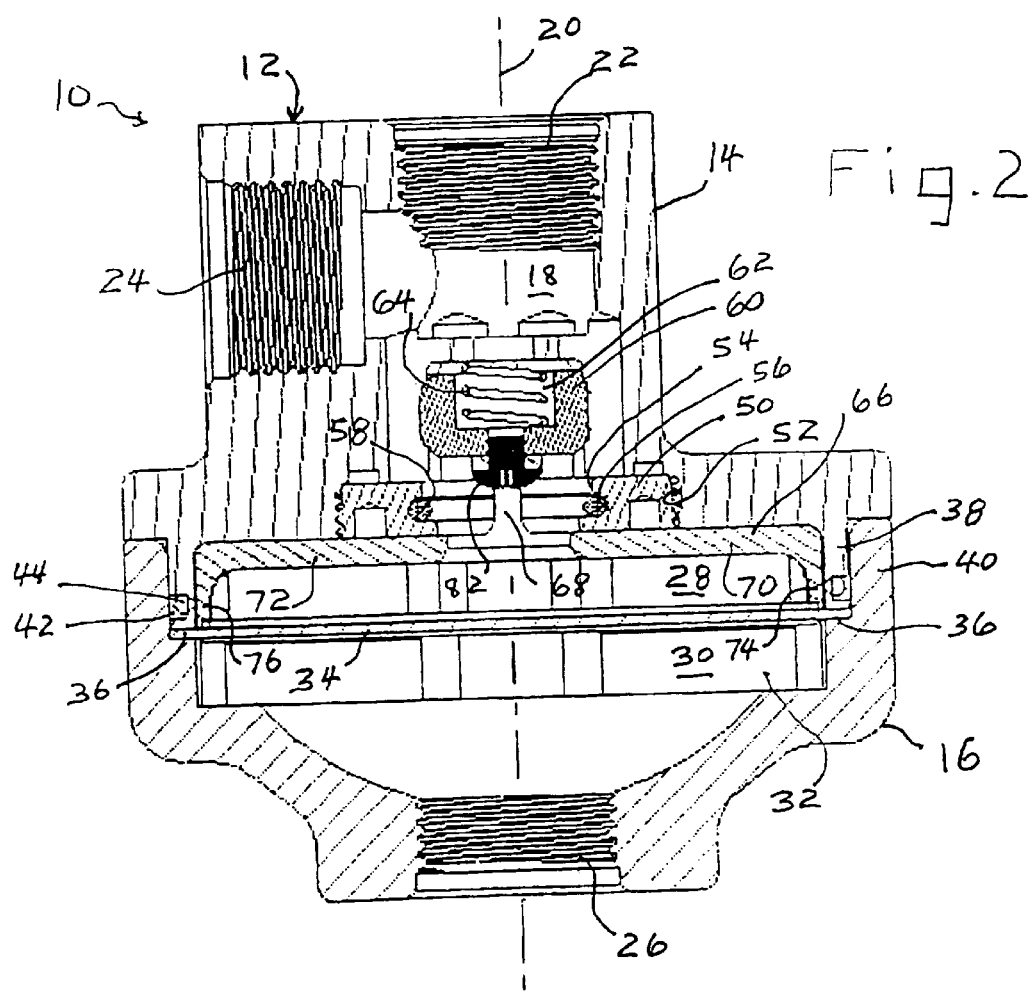
FIG. 2 is a cross-sectional view of the fuel filter assembly.

Referring now in more detail to the drawings, in which like numerals indicate like parts throughout the several views, FIG. 1 illustrates the fuel filter assembly 10 that includes a filter housing 12 formed of first and second housing segments 14 and 16. The first housing segment, also known as the inlet housing segment, includes an inlet port 18 that is aligned with the axial center line 20 of the housing, with axial connector 22 also extending coaxially with the housing, and radial connector 24 extending at a right angle with respect to the axial center line 20, both connectors 22 and 24 in communication with inlet port 18.

The second or outlet housing segment 16 includes an axial outlet connection 26 that also functions as an axial outlet port.

The segments of the filter housing each define cavities 28 and 30, with the cavity 28 being formed by the inlet housing segment 14 and functioning as an unfiltered fuel chamber, and the cavity 30 formed by the outlet housing segment 16 and functioning as a filtered fuel chamber. The unfiltered fuel chamber 28 and filtered fuel chamber 30 together form a filter chamber 32, and a filter 34 spans across the filter chamber. The filter chamber 32 and filter 34 are both circular, and the filter 34 includes a perimeter 36 that is engaged by and clamped by the housing segments, to maintain the filter in the position illustrated.

The inlet housing segment 14 includes a circular mounting flange 38, while outlet housing segment 16 includes its circular mounting flange 40. The mounting flanges 38 and 40 mount the segments together and function as sealing flanges, in that are sized and shaped so as to telescopically fit together. The circular mounting flange 40 of the outlet housing segment 16 surrounds and receives the circular mounting flange 38 of the inlet housing segment 14. A seal is formed between the mounting flanges 36 and 38, with the seal being established by an annular groove 42 formed in the outer surface of the circular mounting flange 38 of outlet housing segment 16, and an O-ring 44 received in the annular groove 42. The O-ring is of sufficient breadth so as to engage the facing surface of the circular mounting flange 40 of the outlet housing segment 16, thereby sealing the segments together to avoid leakage of fuel between the segments.

It would be noted that the circular mounting flange 40 of the outlet housing segment 16 is of an additional length that extends beyond the O-ring 44, so that a seal is maintained between the housing segments 14 and 16 for a distance equal to the overlap of the circular flange 40 about the seal 44 as the housing segments are telescopically separated.

Valve seat support 50 is approximately disk-shaped and its periphery is spirally threaded. The valve seat support 50 is received in the recess 52 of corresponding shape, with inwardly facing spiral threads that receive the threads of the valve seat support. The valve seat support 50 includes a circular fuel passageway, with an annular, inwardly facing groove 56. Valve seat 58 is positioned in the annular groove 56. The valve seat comprises a replaceable O-ring that surrounds the fuel passageway 54.

Valve or plug 60 is axially aligned with the valve seat 58 and is moveable along the axial center line 20 toward and away from engagement with the valve seat 58. An internal spring receiving cavity 62 is formed in the valve 60, extending downwardly partway through the valve 60 for receiving a coil compression spring 64. Spring 64 bears against the inside bore of the cavity 62 and urges the valve 60 down into engagement with valve seat 58. This closes the valve, terminating the flow of fuel through the filter housing 12.

Valve actuator 66 is positioned between filter 34 and valve 60. As best shown in FIG. 3, valve actuator 66 includes a stem or bracket 68 that is of a breadth smaller than the interior dimensions of valve seat 58 so that it can pass through the valve seat 58 and engage valve 60. Valve actuator 66 also includes laterally extending arms 70 and 72 that are located in the unfiltered fuel chamber 28, above the filter 34, and axially extending filter engaging prongs 74 are located at the ends of the lateral arms and face the perimeter 36 of the filter 34. The central portion of the lateral arms 70 and 72 define a large opening 78, and the stem or bracket 68 defines a smaller opening 80. Connector 82 passes through the large opening 78, with its stem extending through the smaller opening 80 and connecting the stem 68 to the valve 60 so that the valve actuator 66 moves in unison with valve 60.

Filter 34 typically is fabricated of a metal screen material of a gauge suitable for performing its filter functions, and is of sufficient strength to withstand not only the movement of fuel through the filter, but the engagement by the valve actuator 66. The filter engaging prongs 74 and 76 of the valve actuator are located at the perimeter 36 of the filter so as to engage the filter adjacent the position where the filter is supported between the inlet housing segment 14 and the outlet housing segment 16 of the filter housing. While a valve actuator having lateral arms is disclosed herein, other configurations can be used, such as 3 or more arms that engage about the fuel filter 34.

The amplitude of movement of the valve 60 toward and away from its valve seat 58 is less than the sealed movement of the telescopic mounting flanges 38 and 40, so that the housing segments 14 and 16 can be moved axially and telescopically with respect to each other to withdraw from each other, and the seal between the housing segments will continue during this withdrawal for a distance greater than the movement of the valve 60 toward its valve seat 58. This opening movement of the housing segments causes the valve to engage its valve seat to close the valve and the flow of fuel through the filter housing is terminated before the housing segments 14 and 16 are separated. This thereby limits the amount of fuel spillage from the fuel filter assembly upon opening the filter housing.

The filter housing is shown with a circular or disk-shaped filter and cylindrically-shaped mounting flanges 38 and 40. This shape enhances the ability of the housing segments 14 and 16 to be oriented at different angles with respect to one another, so that the radial connector 24 can be clocked at 90° orientation about the filter housing to face the conduit that brings fuel to the filter assembly.

While a circular configuration of the filter and mounting flanges has been disclosed, other shapes are available, such as square, octagonal, etc.

Although a preferred embodiment of the invention has been disclosed in detail herein, it will be obvious to those skilled in the art that variations and modifications of the disclosed embodiment can be made without departing from the spirit and scope of the invention as set forth in the following claims.

I claim:

1. A fuel filter assembly for an internal combustion engine comprising:
   a filter housing formed of first and second housing segments,
   said housing segments defining a filter chamber,
   a filter positioned in said filter chamber between said housing segments,
   said first housing segment having an inlet port,
   said second housing segment having an outlet port,
   a valve seat mounted to said first housing segment in fluid communication with said inlet port,
   a valve in said valve housing and movable into and out of engagement with said valve seat,
   a valve stem extending through a fuel passageway,
   a valve actuator in said filter chamber connected to said valve stem and extending toward engagement with said filter,
   said valve actuator configured to move said valve into closed relationship with said valve seat and block the spillage of fuel from said fuel filter assembly in response to said filter being removed from said filter chamber,
   said valve actuator being sized and shaped to open said valve away from said valve seat in response to said filter being placed in said filter chamber.

2. The fuel filter assembly of claim 1, wherein
   said filter is disc shaped with a perimeter rim and filter material inside said rim,
   said valve actuator configured to engage the filter at said rim, and said inlet port, said outlet port, said filter, and said valve being axially aligned.

3. The fuel filter assembly of claim 1, wherein said filter is disc-shaped and has a circular perimeter rim, and said valve actuator is configured to engage said filter at said rim.

4. The fuel filter assembly of claim 1, wherein said first and second housing segments are formed with mounting flanges that are sized and shaped to telescopically fit together, a seal positioned between said mounting flanges, the length of said telescopic fit being greater than the movement of said valve toward and away form the valve seat, so that the valve engages the valve seat before the mounting flanges separate when disconnecting the first and second housing segments from each other to limit the volume of liquid escaping from the fuel filter assembly.

5. The fuel filter of claim 1, wherein said filter is positioned normal to the path of fuel through said fuel passageway, and said valve housing includes an axial inlet connection and a radial inlet connection, said axial inlet connection configured to introduce fuel to said inlet port in a direction parallel to said path of fuel through said chamber, and said radial inlet connection configured to introduce fuel to said inlet port in a direction normal to said path of fuel through said chamber.

6. The fuel filter assembly of claim 3, wherein said first housing segment is shaped to be connected to said second housing segment at different positions whereby said radial inlet connection can be oriented at different angles about said housing.

7. A fuel filter assembly for an internal combustion engine comprising:

a housing formed of first and second housing segments, said housing segments defining a filter chamber, a disc-shaped filter positioned in said filter chamber between said housing segments, said first housing segment having an inlet port in communication with said filter chamber, said second housing segment having an outlet port in communication with said filter chamber, a valve seat in fluid communication with said inlet port, a valve movable into and out of engagement with said valve seat to open and close the flow of fuel through the housing, said inlet port, said disc-shaped filter, said outlet port and said valve seat being axially aligned with one another, a valve actuator extending between said valve and said filter, said valve actuator configured to move said valve into closed relationship with said valve seat and block the spillage of fuel from said fuel filter assembly in response to said filter being removed from said filter chamber, and said valve actuator being sized and shaped to open said valve away from said valve seat in response to said filter being placed in said filter chamber.

8. The fuel filter assembly of claim 7, wherein said filter has a perimeter rim, and said valve actuator has a plurality of filter engagement legs configured to engage said perimeter rim.

9. The fuel filter assembly of claim 7, wherein said filter has a perimeter rim, and said valve actuator is configured to engage said rim.

10. The fuel filter assembly of claim 7, wherein said first and second housing segments are formed with mounting flanges that are sized and shaped to telescopically fit together, a seal positioned between said mounting flanges, the length of said telescopic fit about said seal being greater than the movement of said valve toward and away form the valve seat, so that the valve engages the valve seat before the mounting flanges separate when disconnecting the first and second housing segments from each other to limit the volume of liquid escaping from the fuel filter assembly.

11. The fuel filter of claim 7, wherein said filter is positioned normal to the path of fuel through said fuel chamber, and said valve housing includes an axial inlet connection configured to introduce fuel to said inlet port in a direction parallel to said path of fuel through said chamber, and a radial inlet connection configured to introduce fuel to said inlet port in a direction normal to said path of fuel through said chamber.

12. The fuel filter assembly of claim 7, wherein said first housing segment is shaped to be connected to said second housing segment at different positions whereby said radial inlet conduit can be oriented at different angles about said housing.

* * * * *